(12) United States Patent
Kiser et al.

(10) Patent No.: US 10,951,888 B2
(45) Date of Patent: Mar. 16, 2021

(54) COMPRESSED HIGH DYNAMIC RANGE VIDEO

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 0 days.

(21) Appl. No.: 16/103,263

(22) Filed: Aug. 14, 2018

(65) Prior Publication Data

US 2019/0373260 A1  Dec. 5, 2019

Related U.S. Application Data

(60) Provisional application No. 62/680,242, filed on Jun. 4, 2018.

(51) Int. Cl.
*H04N 19/12* (2014.01)
*H04N 19/136* (2014.01)
*H04N 19/184* (2014.01)

(52) U.S. Cl.
CPC ........... *H04N 19/12* (2014.11); *H04N 19/136* (2014.11); *H04N 19/184* (2014.11)

(58) Field of Classification Search
CPC ..... H04N 19/12; H04N 19/136; H04N 19/184
See application file for complete search history.

(56) References Cited

U.S. PATENT DOCUMENTS

| | | | |
|---|---|---|---|
| 2,560,351 | A | 7/1951 | Kell |
| 2,642,487 | A | 6/1953 | Schroeder |
| 2,971,051 | A | 2/1961 | Back |
| 3,202,039 | A | 8/1965 | DeLang |
| 3,381,084 | A | 4/1968 | Wheeler |
| 3,474,451 | A | 10/1969 | Abel |
| 3,601,480 | A | 8/1971 | Randall |

(Continued)

FOREIGN PATENT DOCUMENTS

| | | |
|---|---|---|
| CN | 101344706 B | 9/2010 |
| EP | 0484802 A2 | 5/1992 |

(Continued)

OTHER PUBLICATIONS

Borer, 2014, Non-linear opto-electrical transfer functions for high dynamic range television, Research and Development White Paper, British Broadcasting Corporation (24 pages).

(Continued)

*Primary Examiner* — Jonathan R Messmore
(74) *Attorney, Agent, or Firm* — Brown Rudnick LLP; Thomas C. Meyers

(57) ABSTRACT

Methods for the real-time, reversible compression of high dynamic range videos, allowing high dynamic range videos to be broadcast through standard dynamic range channels. The methods include streaming pixel values from at least one image sensor through a pipeline on a processor. The pipeline includes an HDR function that combines the streaming pixel values in real-time into an HDR stream and a transfer function that converts the HDR stream to an SDR video stream. The method further includes transmitting the SDR video stream to a receiver in real time for display as a video.

24 Claims, 7 Drawing Sheets

(56) References Cited

U.S. PATENT DOCUMENTS

| | | |
|---|---|---|
| 3,653,748 A | 4/1972 | Athey |
| 3,659,918 A | 5/1972 | Tan |
| 3,668,304 A | 6/1972 | Eilenberger |
| 3,720,146 A | 3/1973 | Yost, Jr. |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,396,188 A | 8/1983 | Dreissigacker et al. |
| 4,486,069 A | 12/1984 | Neil et al. |
| 4,555,163 A | 11/1985 | Wagner |
| 4,584,606 A | 4/1986 | Nagasaki |
| 4,743,011 A | 5/1988 | Coffey |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,092,581 A | 3/1992 | Koz |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,272,518 A | 12/1993 | Vincent |
| 5,386,316 A | 1/1995 | Cook |
| 5,642,191 A | 6/1997 | Mende |
| 5,707,322 A | 1/1998 | Dreissigacker et al. |
| 5,729,011 A | 3/1998 | Sekiguchi |
| 5,734,507 A | 3/1998 | Harvey |
| 5,801,773 A | 9/1998 | Ikeda |
| 5,835,278 A | 11/1998 | Rubin et al. |
| 5,856,466 A | 1/1999 | Cook et al. |
| 5,881,043 A | 3/1999 | Hasegawa et al. |
| 5,900,942 A | 5/1999 | Spiering |
| 5,905,490 A | 5/1999 | Shu et al. |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,392,687 B1 | 5/2002 | Driscoll, Jr. et al. |
| 6,646,716 B1 | 11/2003 | Ramanujan et al. |
| 6,674,487 B1 | 1/2004 | Smith |
| 6,747,694 B1 | 6/2004 | Nishikawa et al. |
| 6,801,719 B1 | 10/2004 | Szajewski et al. |
| 6,856,466 B2 | 2/2005 | Tocci |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,336,299 B2 | 2/2008 | Kostrzewski et al. |
| 7,397,509 B2 | 7/2008 | Krymski |
| 7,405,882 B2 | 7/2008 | Uchiyama et al. |
| 7,714,998 B2 | 5/2010 | Furman et al. |
| 7,719,674 B2 | 5/2010 | Furman et al. |
| 7,731,637 B2 | 6/2010 | D'Eredita |
| 7,961,398 B2 | 6/2011 | Tocci |
| 8,035,711 B2 | 10/2011 | Liu et al. |
| 8,320,047 B2 | 11/2012 | Tocci |
| 8,340,442 B1 | 12/2012 | Rasche |
| 8,441,732 B2 | 5/2013 | Tocci |
| 8,606,009 B2 | 12/2013 | Sun |
| 8,610,789 B1 | 12/2013 | Nayar et al. |
| 8,619,368 B2 | 12/2013 | Tocci |
| 8,622,876 B2 | 1/2014 | Kelliher |
| 8,659,683 B1 | 2/2014 | Linzer |
| 8,982,962 B2 | 3/2015 | Alshin et al. |
| 9,087,229 B2 | 7/2015 | Nguyen et al. |
| 9,129,445 B2 | 9/2015 | Mai et al. |
| 9,131,150 B1 | 9/2015 | Mangiat et al. |
| 9,277,122 B1 | 3/2016 | Imura et al. |
| 9,459,692 B1 | 10/2016 | Li |
| 9,560,339 B2 | 1/2017 | Borowski |
| 9,661,245 B2 | 5/2017 | Kawano |
| 9,675,236 B2 | 6/2017 | McDowall |
| 9,677,840 B2 | 6/2017 | Rublowsky et al. |
| 9,720,231 B2 | 8/2017 | Erinjippurath et al. |
| 9,948,829 B2 | 4/2018 | Kiser et al. |
| 9,955,084 B1 | 4/2018 | Haynold |
| 9,974,996 B2 | 5/2018 | Kiser |
| 2002/0014577 A1 | 2/2002 | Ulrich et al. |
| 2002/0089765 A1 | 7/2002 | Nalwa |
| 2003/0007254 A1 | 1/2003 | Tocci |
| 2003/0016334 A1 | 1/2003 | Weber et al. |
| 2003/0048493 A1 | 3/2003 | Pontifex et al. |
| 2003/0072011 A1 | 4/2003 | Shirley |
| 2004/0119020 A1 | 6/2004 | Bodkin |
| 2004/0125228 A1 | 7/2004 | Dougherty |
| 2004/0143380 A1 | 7/2004 | Stam et al. |
| 2004/0179834 A1 | 9/2004 | Szajewski et al. |
| 2005/0001983 A1 | 1/2005 | Weber et al. |
| 2005/0041113 A1 | 2/2005 | Nayar et al. |
| 2005/0099504 A1 | 5/2005 | Nayar et al. |
| 2005/0117799 A1 | 6/2005 | Fuh et al. |
| 2005/0151860 A1 | 7/2005 | Silverstein et al. |
| 2005/0157943 A1 | 7/2005 | Ruggiero |
| 2005/0168578 A1 | 8/2005 | Gobush |
| 2005/0212827 A1 | 9/2005 | Goertzen |
| 2005/0219659 A1 | 10/2005 | Quan |
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0221209 A1 | 10/2006 | McGuire et al. |
| 2006/0249652 A1 | 11/2006 | Schleifer |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0189750 A1 | 8/2007 | Wong et al. |
| 2007/0189758 A1 | 8/2007 | Iwasaki |
| 2007/0201560 A1 | 8/2007 | Segall et al. |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0055683 A1 | 3/2008 | Choe et al. |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0175496 A1 | 7/2008 | Segall |
| 2008/0198235 A1 | 8/2008 | Chen et al. |
| 2008/0198266 A1 | 8/2008 | Kurane |
| 2008/0297460 A1 | 12/2008 | Peng et al. |
| 2009/0059048 A1 | 3/2009 | Luo et al. |
| 2009/0213225 A1 | 8/2009 | Jin et al. |
| 2009/0225433 A1 | 9/2009 | Tocci |
| 2009/0244717 A1 | 10/2009 | Tocci |
| 2009/0290043 A1 | 11/2009 | Liu et al. |
| 2010/0201799 A1 | 8/2010 | Mohrholz et al. |
| 2010/0225783 A1 | 9/2010 | Wagner |
| 2010/0271512 A1 | 10/2010 | Garten |
| 2010/0328780 A1 | 12/2010 | Tocci |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |
| 2011/0221793 A1 | 9/2011 | King, III et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0179833 A1 | 7/2012 | Kenrick et al. |
| 2012/0212964 A1 | 8/2012 | Chang et al. |
| 2012/0241867 A1 | 9/2012 | Ono et al. |
| 2012/0242867 A1 | 9/2012 | Shuster |
| 2012/0260174 A1* | 10/2012 | Imaida ............ G11B 27/034 715/721 |
| 2012/0299940 A1 | 11/2012 | Dietrich, Jr. et al. |
| 2013/0021447 A1 | 1/2013 | Brisedoux et al. |

(56) References Cited

U.S. PATENT DOCUMENTS

| | | | |
|---|---|---|---|
| 2013/0021505 A1 | 1/2013 | Plowman et al. | |
| 2013/0038689 A1 | 2/2013 | McDowall | |
| 2013/0063300 A1 | 3/2013 | O'Regan et al. | |
| 2013/0093805 A1 | 4/2013 | Iversen | |
| 2013/0094705 A1 | 4/2013 | Tyagi et al. | |
| 2013/0194675 A1* | 8/2013 | Tocci | G02B 5/04 |
| | | | 359/636 |
| 2013/0250113 A1 | 9/2013 | Bechtel et al. | |
| 2013/0286451 A1 | 10/2013 | Verhaegh | |
| 2013/0329053 A1 | 12/2013 | Jones et al. | |
| 2014/0002694 A1 | 1/2014 | Levy et al. | |
| 2014/0063300 A1 | 3/2014 | Lin et al. | |
| 2014/0085422 A1 | 3/2014 | Aronsson et al. | |
| 2014/0132946 A1 | 5/2014 | Sebastian et al. | |
| 2014/0152694 A1 | 6/2014 | Narasimha et al. | |
| 2014/0168486 A1 | 6/2014 | Geiss | |
| 2014/0184894 A1 | 7/2014 | Motta | |
| 2014/0192214 A1 | 7/2014 | Laroia | |
| 2014/0198187 A1 | 7/2014 | Lukk | |
| 2014/0210847 A1 | 7/2014 | Knibbeler et al. | |
| 2014/0263950 A1 | 9/2014 | Fenigstein et al. | |
| 2014/0313369 A1 | 10/2014 | Kageyama et al. | |
| 2015/0201222 A1 | 7/2015 | Mertens | |
| 2015/0208024 A1 | 7/2015 | Takahashi et al. | |
| 2015/0245043 A1 | 8/2015 | Greenebaum et al. | |
| 2015/0245044 A1* | 8/2015 | Guo | G09G 5/02 |
| | | | 375/240.03 |
| 2015/0296140 A1 | 10/2015 | Kim | |
| 2015/0302562 A1 | 10/2015 | Zhai et al. | |
| 2015/0312498 A1 | 10/2015 | Kawano | |
| 2015/0312536 A1 | 10/2015 | Butler et al. | |
| 2016/0007052 A1 | 1/2016 | Haitsuka et al. | |
| 2016/0050354 A1 | 2/2016 | Musatenko et al. | |
| 2016/0057333 A1 | 2/2016 | Liu et al. | |
| 2016/0163356 A1 | 6/2016 | De Haan et al. | |
| 2016/0173811 A1 | 6/2016 | Oh et al. | |
| 2016/0205368 A1 | 7/2016 | Wallace et al. | |
| 2016/0252727 A1 | 9/2016 | Mack et al. | |
| 2016/0323518 A1 | 11/2016 | Rivard et al. | |
| 2016/0345032 A1 | 11/2016 | Tsukagoshi | |
| 2016/0353123 A1 | 12/2016 | Ninan | |
| 2016/0360212 A1 | 12/2016 | Dai et al. | |
| 2016/0375297 A1 | 12/2016 | Kiser | |
| 2017/0006273 A1 | 1/2017 | Borer et al. | |
| 2017/0070719 A1 | 3/2017 | Smolic et al. | |
| 2017/0126987 A1 | 5/2017 | Tan et al. | |
| 2017/0155818 A1 | 6/2017 | Bonnet | |
| 2017/0155873 A1 | 6/2017 | Nguyen | |
| 2017/0186141 A1 | 6/2017 | Ha et al. | |
| 2017/0237879 A1 | 8/2017 | Kiser et al. | |
| 2017/0237890 A1 | 8/2017 | Kiser et al. | |
| 2017/0237913 A1 | 8/2017 | Kiser et al. | |
| 2017/0238029 A1 | 8/2017 | Kiser et al. | |
| 2017/0279530 A1 | 9/2017 | Tsukagoshi | |
| 2017/0302858 A1 | 10/2017 | Porter et al. | |
| 2018/0048801 A1* | 2/2018 | Kiser | H04N 9/045 |
| 2018/0152721 A1* | 5/2018 | Rusanovskyy | H04N 19/176 |
| 2018/0198957 A1 | 7/2018 | Kiser et al. | |
| 2020/0219236 A1* | 7/2020 | Olivier | H04L 65/80 |

FOREIGN PATENT DOCUMENTS

| | | |
|---|---|---|
| EP | 1225574 A2 | 7/2002 |
| EP | 1395062 A1 | 3/2004 |
| GB | 2526047 A | 11/2015 |
| GB | 2539917 A | 1/2017 |
| JP | S53093026 A | 8/1978 |
| JP | S53124028 A | 10/1978 |
| JP | S60213178 A | 10/1985 |
| JP | S63160489 A | 7/1988 |
| JP | H0468876 A | 3/1992 |
| JP | H0564070 A | 3/1993 |
| JP | H06335006 A | 12/1994 |
| JP | H07107346 A | 4/1995 |
| JP | H08220585 A | 8/1996 |
| JP | H11127441 A | 5/1999 |
| JP | 2000019407 A | 1/2000 |
| JP | 2000338313 A | 12/2000 |
| JP | 2001136434 A | 5/2001 |
| JP | 2002165108 A | 6/2002 |
| JP | 2003035881 A | 2/2003 |
| JP | 2007295326 A | 11/2007 |
| WO | 2005025685 A1 | 3/2005 |
| WO | 2009/111642 A1 | 9/2009 |
| WO | 2009/121068 A2 | 10/2009 |
| WO | 2011/032028 A2 | 3/2011 |
| WO | 2012/076646 A1 | 6/2012 |
| WO | 2015/072754 A1 | 5/2015 |
| WO | 2015/173570 A1 | 11/2015 |
| WO | 2017/139596 A1 | 8/2017 |
| WO | 2017/157845 A1 | 9/2017 |

OTHER PUBLICATIONS

Bravo, 2011, Efficient smart CMOS camera based on FPGAs oriented to embedded image processing, Sensors 11:2282-2303.

Lyu, 2014, A 12-bit high-speed column parallel two-step single-slope analog-to-digital converter (ADC) for CMOS image sensors, Sensors 14:21603-21625.

Rahman, 2011, Pipeline synthesis and optimization of FPGA-based video processing applications with CAL, EURASIP J Image Vid Processing 19:1-28.

Schulte, 2016, HDR Demystified: Emerging UHDTV systems, SpectraCal 1-22.

Sony, 2017, HDR (High Dynamic Range), Sony Corporation (16 pages).

Abstract of JP 2000019407 A (2 pages).

Abstract of JP 2003035881 A (2 pages).

Abstract of JP S60213178 A (2 pages).

Aggarwal, 2004, Split Aperture Imaging for High Dynamic Range, Int J Comp Vis 58(1):7-17.

Alleysson, 2006, HDR CFA Image Rendering, Proc EURASIP 14th European Signal Processing Conf.

Banterle, 2009, High dynamic range imaging and low dynamic range expansion for generating HDR content, Eurographics State of the The Art Report (18 pages).

Debevec, 1997, Recovering High Dynamic Range Radiance Maps from Photographs, Int Conf Comp Graphics and Interactive Techniques, proceedings.

Flux Data Inc, 2008, FD-1665 High Resolution 3 CCD Multispectral Industrial Camera, web.archive.orgweb20080113023949www.fluxdata.com/prod (7 pages).

International Search Report and Written Opinion dated Apr. 14, 2017, for PCT/US17/17396 filed Feb. 10, 2017 (9 pages).

International Search Report and Written Opinion dated Apr. 28, 2017, for PCT/US17/17405, filed Feb. 10, 2017 (9 pages).

International Search Report and Written Opinion dated May 2, 2017, for PCT/US17/16991, filed Feb. 8, 2017 (7 pages).

International Search Report and Written Opinion dated May 8, 2017, for PCT/US17/17400 filed Feb. 10, 2017 (8 pages).

International Search Report and Written Opinion dated Oct. 23, 2017, for International application No. PCT/US17/45683, with International filing date Aug. 7, 2017 (5 pages).

International Search Report and Written Opinion dated Sep. 20, 2018, for International Application No. PCT/US2018/041034 (10 pages).

Kao, 2008, High Dynamic Range Imaging by Fusing Multiple Raw Images and Tone Reproduction, IEEE Transactions on Consumer Electronics 54(1):10-15.

Lukac, 2004, Demosaicked Image Postprocessing Using Local Color Ratios, IEEE Transactions on Circuits and Systems for Video Technology 14(6):914-920.

Machine translation of CN 101344706 B, generated on May 19, 2017, by espacenet (11 pages).

Machine translation of JP 2000019407 A generated on May 30, 2017, by EPO website (52 pages).

(56) References Cited

OTHER PUBLICATIONS

Machine translation of JP 2000338313 A generated on Dec. 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 A genertaed on May 30, 2017, by EPO website (19 pages).
Machine translation of JP 2007295326 A generated on Dec. 21, 2016, by the European Patent Office website Espacent (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP S53093026 A, issued as JP S599888, generated on Dec. 21, 2016 (5 pages).
Machine translation of JP S60213178 A generated on May 30, 2017, by EPO website (6 pages).
Myszkowki, 2008, High Dynamic Range Video, Morgan & Claypool Publishers, San Rafael, CA (158 pages).
Nayar, 2000, High dynamic range imaging: spatially varying pixel exposures, 2000 Proc IEEE Conf on Comp Vision and Pattern Rec, ISSN: 1063-6919.
Stumpfel, 2004, Direct HDR Capture of the Sun and Sky, Computer graphics, virtual reality, visualisation and interaction in Africa (9 pages).
Tiwari, 2015, A review on high-dynamic range imaging with its technique, Int J Sig Proc, IPPR 8(9):93-100.
Tocci, 2011, A versatile HDR video production system, ACM Transactions on Graphics (TOG)—Proceedings of ACM SIG-GRAPH 2011, 30(4):article 41.
Touze, 2014, HDR video coding based on local LDR quantization, Second International Conference and SME Workshop on HDR imaging.
Extended European Search Report for EP 17750845.4 dated Aug. 19, 2019 (8 pages).
Extended European Search Report for EP 17750846.2 dated Aug. 19, 2019 (9 pages).
Extended European Search Report dated Aug. 19, 2019, for European patent application No. 17750844.7 (10 pages).
Int Search Report & Written Op dated Sep. 11, 2019, for PCT/US19/35109, filed Jun. 3, 2019 (10 pages).
Machine translation of JP H08 220585 A obtained Feb. 3, 2020, from Espacenet (14 pages).
Machine translation of JPH08220585 generated by European Patent Office on Oct. 15, 2019 (11 pages).
Sony, 2017, HDR (High Dynamic Range), Sony Corporation (15 pages).

* cited by examiner

COMPRESSED HIGH DYNAMIC RANGE VIDEO

CROSS-REFERENCE TO RELATED APPLICATION(S)

This application claims the benefit of U.S. Provisional Application No. 62/680,242, filed Jun. 4, 2018, the contents of which are incorporated by reference.

TECHNICAL FIELD

The disclosure relates to high dynamic range video and related methods and devices.

BACKGROUND

Humans can see brightness variations over a dynamic range of about 10,000:1 simultaneously within a scene. Some cameras are able to capture images over that dynamic range and preserve the dynamic range by encoding the images digitally by storing pixel brightness values 14 bits per color. Human visual perception has a non-linear relationship to brightness, and brightness is often encoded digitally using a non-linear power law known as a gamma function.

Early research and technology such as cathode ray tubes suggested that video signals should be digitized using a gamma function using 8 bits per pixel for brightness. Accordingly, much contemporary digital video for consumer equipment and computer graphics uses 8 bit encoding. Existing television, cable, and satellite channels typically operate with 8 bit signals defining the standard dynamic range. Thus, while some modern cameras capture images at a higher dynamic range, video is typically broadcast and displayed at 8 bit standard dynamic range.

SUMMARY

The invention provides methods for the real-time, reversible compression of high dynamic range videos, allowing high dynamic range videos to be broadcast through standard dynamic range channels. A high-dynamic range video signal is streamed through a pipeline that processes the video stream in a pixel-by-pixel manner as the pixels stream through the pipeline. The pipeline includes a transfer function that that decreases a number of bits of each pixel to a standard dynamic range, in a reversible manner, to allow the high dynamic range video to be transmitted over existing, standard dynamic range channels. The transfer function may be an opto-electrical transfer function (OETF) such as S-Log that converts pixels from greater than 8 bits per color to at most 8 bits per color, and the inverse function may be applied by a receiver such as a display device to display the video with high dynamic range.

The processer process pixels in a pipeline in real-time to form the high dynamic range video. Pipeline processing of the pixels as they stream through the processor provides a high dynamic range (HDR) pixel stream and also uses the OETF to decrease the number of bits per pixel as the pixels stream through the pipeline in a frame-independent manner, allowing the live video to be captured and broadcast for display in real-time. Because the transfer function reversibly decreases the number of bits per pixel, methods are useful for reversibly compressing live high dynamic range video signal for transmission over standard dynamic range channels. After transmission over standard dynamic range channels, the compressed signal may be displayed at the low dynamic range or transformed back into, and displayed at, the high dynamic range.

In preferred embodiments, the pipeline processing is performed on a processor of a video camera that uses one or more sensors to capture incoming light. The sensors may use an optical splitting system with a beam splitter that splits incoming light onto the multiple image sensors. By using a beamsplitter with an asymmetric split ratio, the multiple image sensors capture images that are identical except for light level. That is, one of the sensors captures a bright version of an image while another captures the same image, at a lower light level. Those images are streamed from the sensors onto the processor where they are merged, in pipeline processing, to form a high dynamic range image. Portions of the bright image that are saturated can be replaced with corresponding portions from the less-bright image. A pipeline on the processing device can do this in a streaming, pixel-by-pixel manner so that a high dynamic range (HDR) stream is formed in real time as the camera is used to capture a scene. The pipeline also applies an opto-electrical transfer function (OETF) to the HDR stream to reversibly convert them into a standard dynamic range (SDR) video stream (e.g., 8 bit), which can be transmit or broadcast over existing 8 bit infrastructure. Thus embodiments of the disclosure include methods and devices for capturing a video signal and streaming it as pixel values in real time as an HDR stream, applying a transfer function such as s-log to compress the HDR stream into an SDR video stream, and broadcasting the compressed SDR video stream in real time with the capturing.

In certain aspects, the disclosure provides a video processing method. The method includes streaming pixel values from at least one image sensor through a pipeline on a processor. The pipeline includes an HDR function that combines the streaming pixel values in real-time into an HDR stream and a transfer function that converts the HDR stream to an SDR video stream. The method further includes transmitting the SDR video stream to a receiver in real time for display as a video.

Optionally, the method includes applying an inverse of the transfer function to the SDR video stream within the receiver to de-compress the video stream back into an HDR video for display, where the receiver is an HDR display device. Preferably, the HDR function and the transfer function are done by pipeline processing on a pixel-by-pixel basis while the streaming and transmitting steps are performed simultaneously.

Where the image sensor and processor are provided within a video camera, the pipeline processing allows the camera to capture the video of a live event for display by the receiver as live playback. The receiver may itself be an HDR display device. Preferably, the HDR stream comprises HDR pixels that use greater than 8 bits per color (e.g., 14 bit) and the SDR video stream comprises SDR pixels that use no more than 8 bits per pixel value (e.g., 8 bit). The transfer function may be an opto-electric transfer function such as S-Log 1, S-Log 2, or S-Log 3, and the method may include providing the receiver with an electro-optical transfer function (EOTF, an inverse of the OETF) for use by the receiver to convert the SDR video stream into an HDR video stream. The transfer function may be any suitable EOTF such as, for example, Filestream, S-Log, Panalog, Log C, and Canon Log.

Embodiments of the methods may include receiving incoming light through a lens and at least one beamsplitter, in which the beamsplitter splits the incoming light onto multiple image sensors such that the multiple image sensors each receive images that are identical but for light level. The HDR function in the pipeline may include a kernel operation that identifies saturated pixel values and a merge operation that merges the pixel values to produce the HDR stream. Merging may exclude at least some of the saturated pixel values from the HDR video signal.

Preferably, the multiple image sensors include at least a high exposure (HE) sensor and a middle exposure (ME) sensor, and wherein merging the sequences includes using HE pixel values that are not saturated and ME pixel values corresponding to the saturated pixel values. By using, for example, an asymmetric beamsplitter, at least 95% of the incoming light impinges on, or is captured by, the multiple image sensors. In some embodiments, streaming the pixel values through the kernel operation includes examining values from a neighborhood of pixels surrounding a first pixel on the HE sensor, finding saturated values in the neighborhood of pixels, and using information from a corresponding neighborhood on the ME sensor to estimate a value for the first pixel. Real-time, pipeline processing provides that at least some pixel values may be converted to SDR by the transfer function while the image sensors are still converting the incoming light into the pixel values for the same image, or frame. Sequences of the pixel values may be streamed through the processing device and merged without waiting to receive pixel values for an entire image from all pixel sites on the image sensors, In related aspects, the disclosure provides a high dynamic range video camera. The camera includes at least one image sensor coupled to a processor and a pipeline on the processor that processes streams of pixel values from the sensor. The pipeline includes an HDR function that combines the streaming pixel values in real-time into an HDR video stream and a transfer function that converts the HDR video stream to an SDR video stream. Preferably, the HDR video stream comprises HDR pixel values with light levels encoded at greater than 8 bits per color, per pixel, and the SDR video stream comprises SDR pixel values with light levels encoded at no greater than 8 bits per color, per pixel. The HDR function and the transfer function may be performed in real-time on the streaming pixel values such that the SDR video stream can be received and displayed by a receiver as a live broadcast.

In preferred embodiments, the image sensor is provided in an optical splitting system that comprises a lens, at least one beamsplitter, and a plurality of image sensors. The plurality of image sensors may include at least a high exposure (HE) sensor and a middle exposure (ME) sensor, with the HE sensor, the ME sensor, the lens and the beamsplitter arranged to receive an incoming beam of light and split the beam of light into at least a first path that impinges and HE sensor and a second path that impinges on the ME sensor. The beamsplitter directs a majority of the light to the first path and a lesser amount of the light to the second path. The first path and the second path impinge on the HE and the ME sensor, respectively, to generate images that are optically identical but for light level.

In certain embodiments, the HDR function in the pipeline includes a kernel operation that identifies saturated pixel values and a merge module to merge the pixel values to form the HDR video stream. The kernel operation may be designed to operate on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel. The pipeline may include (e.g., in the following order) a sync module to synchronize the pixel values as the pixel values stream onto the processing device from the plurality of image sensors; the HDR function comprising the kernel operation and the merge module; a demosaicing module; a tone-mapping operator; and the transfer function. The transfer function preferably includes an opto-electrical transfer function (OETF) such as an S-Log function.

DETAILED DESCRIPTION

The disclosure provides methods and devices that apply an EOTF (electro-optic transfer function) to a stream of pixels, to convert a video stream with for example more than 8 bits per color to a video stream with 8 bits per color. The EOTF provides a modified gamma function, such as may be used in an S-Log function. Methods may further include applying the inverse EOTF at the other end of the transmission to convert, e.g., the 8 bits per color video signal back into a signal with greater than 8 bits per color.

For example, a video stream may have 14 bits per color. Methods of the disclosure apply a specific S-log transfer function to that stream (preferably in a pipeline process, pixel-by-pixel) to convert each pixel to 8-bits per color. Then the 8-bit video signal may be sent via a standard 8-bit television, cable, or satellite channel to a receiver, where the receiver would apply an inverse of the transfer function to produce a 14-bit signal which could then be displayed on a 14-bit display. Thus, methods and devices of the disclosure are useful for transmitting HDR video over standard TV channels.

Figure 1:
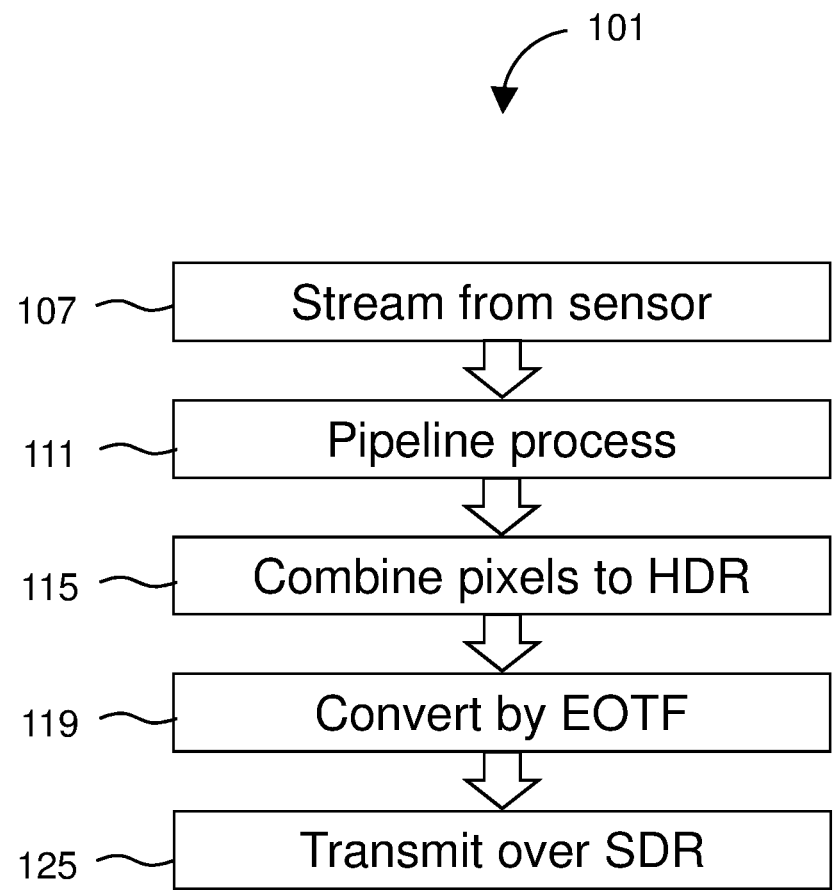
FIG. 1 diagrams a video processing method.

FIG. 1 diagrams a video processing method 101. The method 101 includes streaming 107 pixel values from at least one image sensor. The pixel are processed 111 through a pipeline on a processor. The pipeline includes an HDR function that combines 115 the streaming pixel values in real-time into an HDR stream and a transfer function that converts 119 the HDR stream to an SDR video stream. The method further includes transmitting 125 the SDR video stream to a receiver in real time for display as a video. The pipeline is preferably embodied within a processor which thus includes the HDR function and the transfer function. The processor may be connected to one or more image sensors within an apparatus such as a video camera according to certain embodiment.

Figure 2:
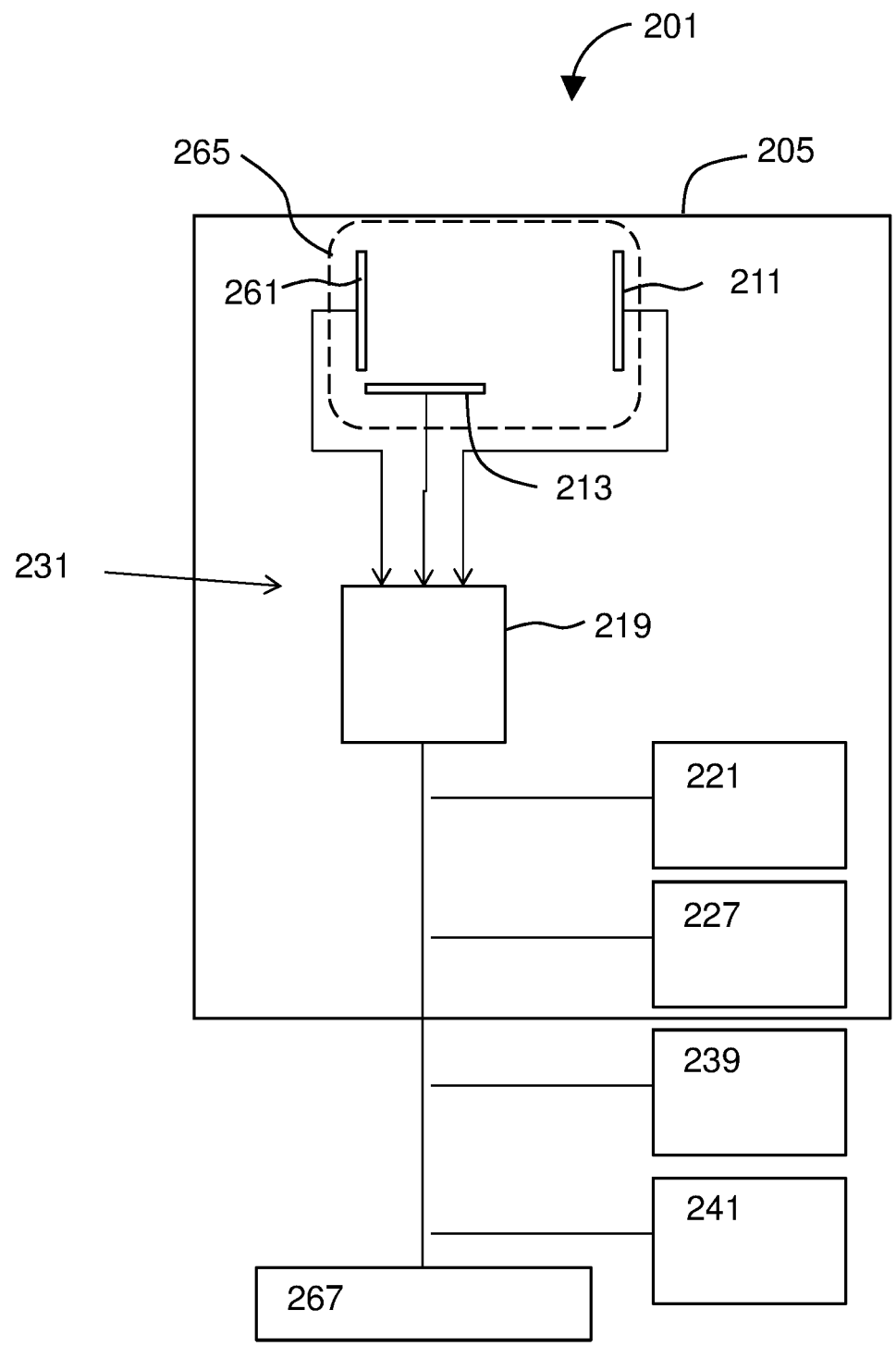
FIG. 2 diagrams components of a high dynamic range video camera.

FIG. 2 diagrams components of an apparatus 201 (e.g., a high dynamic range video camera) that includes at least one image sensor 211 coupled to a processor 219 such as a field-programmable gate array (FPGA) or an application-specific integrated circuit (ASIC). A plurality of image sensors 265 are coupled to the processing device 219. The apparatus 201 is configured to stream pixel values 501 from each of the plurality of image sensors 265 in a frame independent-manner through a pipeline 231 on the processing device 219. The pipeline 231 includes an HDR function that combines the streaming pixel values in real-time into an HDR video stream and a transfer function that converts the HDR video stream to an SDR video stream. Various components of the apparatus 201 may be connected via a printed circuit board 205. The apparatus 201 may also include memory 221 and optionally a processor 227 (such as a general-purpose processor like an Intel chip). Apparatus 201 may further include one or more of an input-output device 239 or a display 267. The at least one sensor 211 may be provided as part of an optical splitting system that includes the plurality 265 of sensors.

Figure 3:
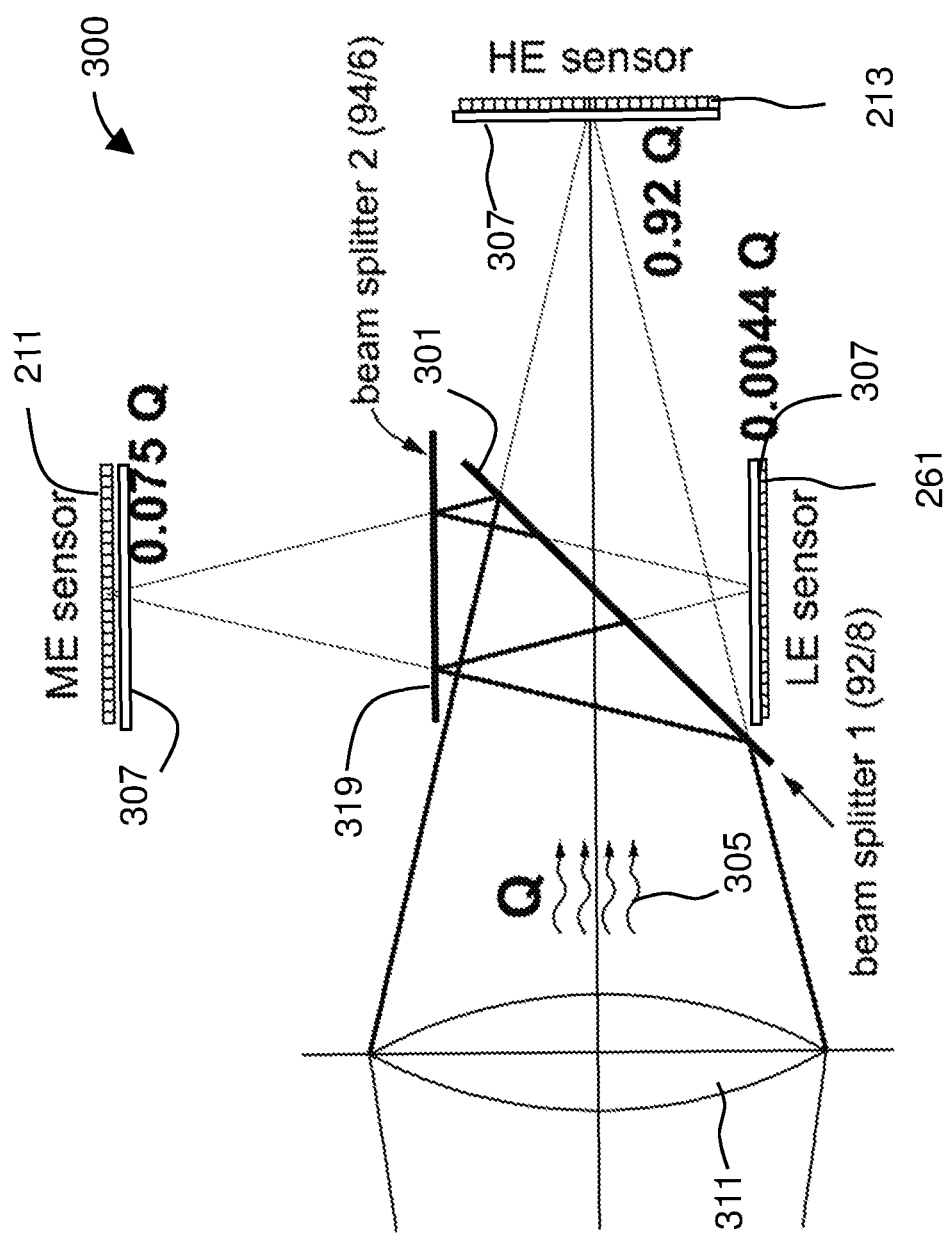
FIG. 3 shows the optical splitting system according to certain embodiments.

FIG. 3 shows the optical splitting system 300 and an arrangement of the plurality 265 of sensors. The plurality 265 of sensors preferably include at least a high exposure (HE) sensor 213 and a middle exposure (ME) sensor 211. Each image sensor may have its own color filter array 307. The color filter arrays 307 may operate as a Bayer filter such as a repeating grid of red, green, blue, green filters. The optical splitting system 300 preferably includes a lens 311 and at least one beamsplitter 301. The HE sensor 213, the ME sensor 211, the lens 311 and the at least one beamsplitter 301 are arranged to receive an incoming beam of light 305 and split the beam of light 305 into at least a first path that impinges and HE sensor 213 and a second path that impinges on the ME sensor 211. The apparatus 201 uses a set of partially-reflecting surfaces to split the light from a single photographic lens 311 so that it is focused onto three imaging sensors simultaneously. In a preferred embodiment, the light is directed back through one of the beamsplitters a second time, and the three sub-images are optically identical except for their light levels. The optical splitting system 300 allows the apparatus 201 to capture HDR images using most of the light entering the camera. Generally, the image sensors will include analog-to-digital converters and when light 305 impinges upon the sensors 211, 213, pixel values will stream onto the processor 219.

Figure 4:
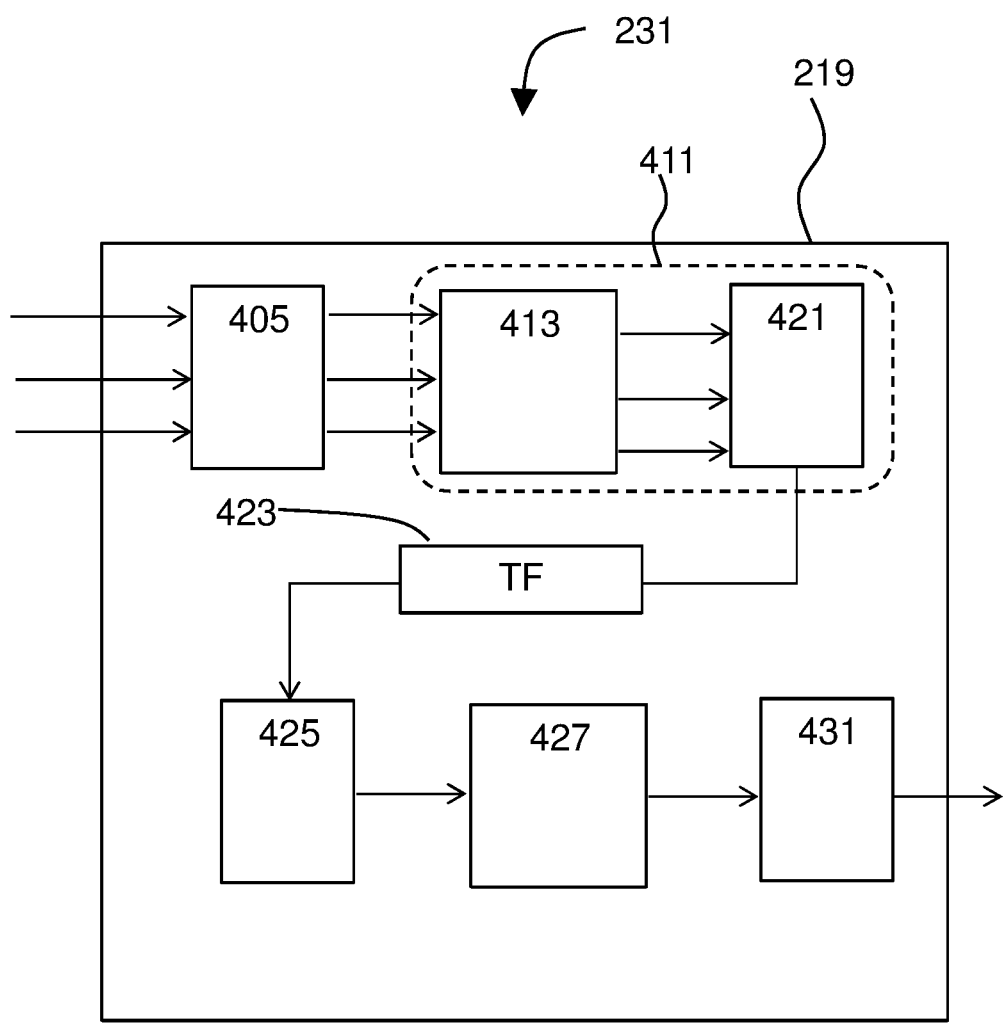
FIG. 4 shows the processor of the camera.

FIG. 4 shows the processor 219 on the apparatus 201. Pixel values from the sensors stream through the pipeline 231 on the processing device 219. The pipeline 231 may include a sync module 405 to synchronize the pixel values 501 as the pixel values 501 stream onto the processing device 219 from the plurality of image sensors 265. The pipeline includes an HDR function 411 that combines the streaming pixel values in real-time into an HDR video stream, and a transfer function 423 that converts the HDR video stream to an SDR video stream. In preferred embodiments, the HDR function includes a kernel operation 413 and a merge module 421. The kernel operation 413 identifies saturated pixel values 501 and the merge module merges the pixel values 501 to produce an HDR stream. The pipeline may further include a demosaicing module 425, a tone-mapping operator 427, one or more auxiliary module 431 such as a color-correction module, or combinations thereof.

In preferred embodiments, the kernel operation 413 operates on pixel values as they stream from each of the plurality 265 of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel. Alternatively, the pipeline 231 may include—in the order in which the pixel values flow: a sync module 405 to synchronize the pixel values as the pixel values stream onto the processing device from the plurality of image sensors; the HDR function 411 comprising the kernel operation 413 and the merge module 421; a demosaicing module 425; a tone-mapping operator 427; and the transfer function 423.

Preferably, the transfer function 423 provides an opto-electrical transfer function (OETF) such as an S-Log function.

Figure 5:
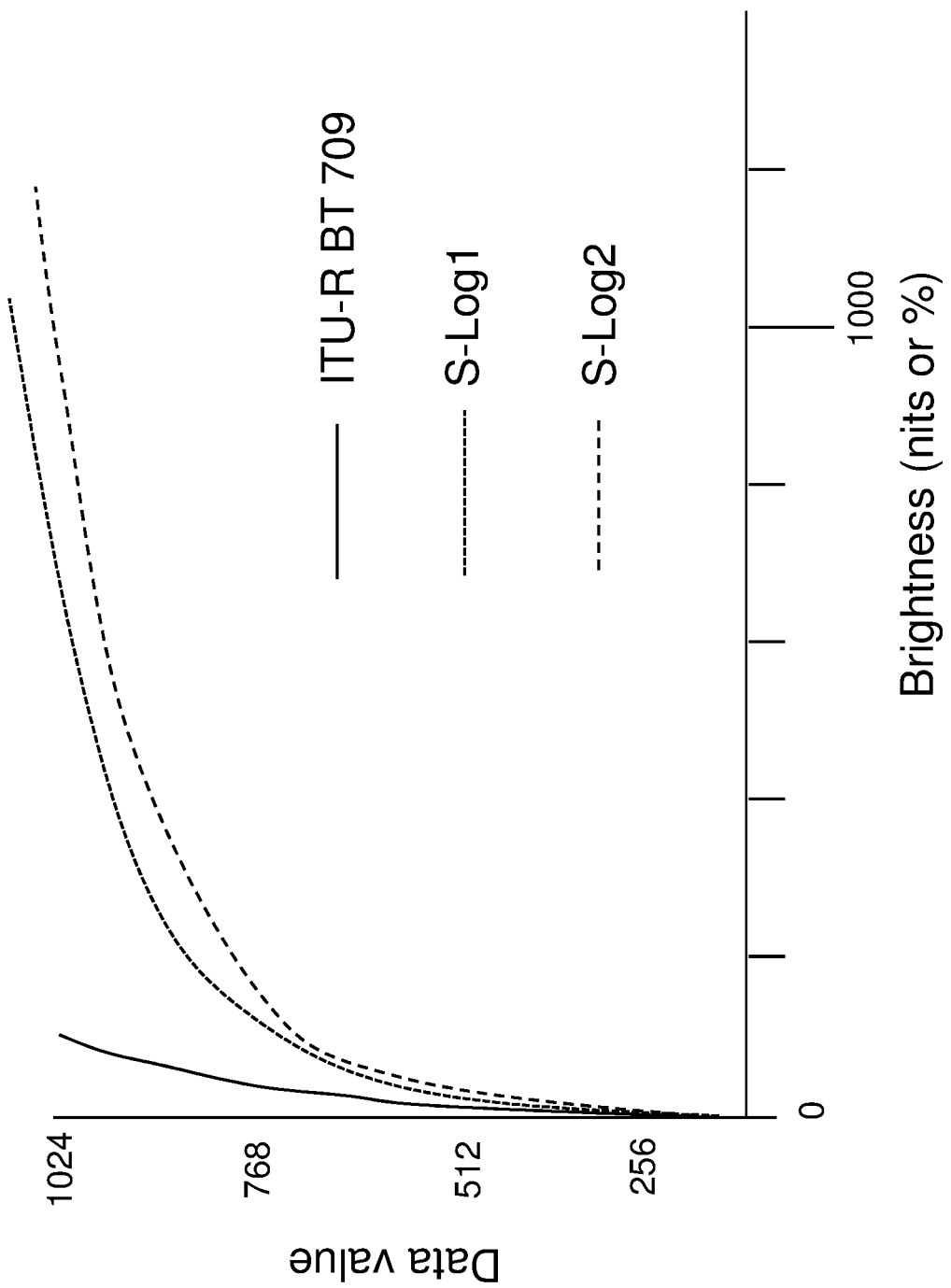
FIG. 5 shows transfer functions that may be used with methods of the disclosure.

FIG. 5 describes two exemplary transfer functions that may be used with methods and devices of the disclosure. The curves depicted as S-Log 1 and S-Log 2 operate as opto-electrical transfer functions and are used to carry the full range of the sensor-captured HDR signal through to subsequent processes. Compared to the ITU 709 curve, the S-log transfer functions cover a much greater range of brightness, for brighter signals within the 512 to 1024 data values as depicted. Other transfer functions are within the scope of the invention. The depicted S-Log functions illustrate the principle. For example, the transfer function may include or be based on Filestream from Thomson, S-Log from Sony, Panalog from Panavision, Log C from Arri, or Canon Log from Canon.

The inverse function may be used and provided for use by the receiver to convert the SDR video stream into an HDR video stream, e.g., where the receiver comprises a high-dynamic range display device. The ITU-R BT 709 curve was designed to produce a uniform perception of video noise in an analog signal. However, in quantizing a video signal, it may be more important to avoid contouring and match the human visual systems brightness perception than to avoid noise. To avoid contouring, detecting the difference between adjacent levels is important and is governed by Weber's law, which states that detectable difference in brightness is proportional to the brightness. Weber's law suggests that a logarithmic transfer function optimizes dynamic range while rendering quantization steps imperceptible. Transfer functions according to the disclosure extend dynamic range with a smooth curve. Those functions at low brightness values are (by design) very similar to the Rec 709 curve. Over relevant ranges, preferred transfer functions approximate logarithmic curves. Transfer functions of the disclosure preferably do not result in visible contouring. Furthermore, if the peak brightness of a display using the proposed OETF is approximately a few hundred cd/rn2, then the OETF approximately corresponds to the sensitivity of the eye. Research suggests that an 8 bit version of such a transfer function should be able to produce a higher dynamic range image without visible artifacts. It should be noted that an 8 bit HDR signal would include some exposure latitude to support post processing such as grading. Application of an 8 bit transfer function via methods and devices of the disclosure will allow a higher dynamic range image to be transferred to a display via an 8 bit interface. For background, see UK Patent Publication No. GB 252047 A and Borer, 2014, Non-linear opto-electrical transfer functions for high dynamic range television, Research and Development White Paper, British Broadcasting Corporation (24 pages), both incorporated by reference. According to research and theory, using a logarithmic or approximately logarithmic transfer function, as compared to ITU-R BT 709 as shown in FIG. 5, an HDR stream is convertible (reversibly) into an 8 bit video signal that can be transmitted over 8 bit channels and converted back into HDR by the inverse function within a display/receiver device, which can then display the HDR video.

By using the pipeline processing described above, in which incoming light is passed through a single lens and split onto multiple sensors to begin streaming parallel streams of HE and ME (and optionally LE) pixels into an HDR function (e.g., one or more blocks on an FPGA) and a transfer function, 8 bit HDR video can be captured, broadcast, and displayed live, meaning that live broadcasts can be performed according to existing understandings of the meanings of live broadcasting or in real-time, and in HDR. In preferred embodiments, the HDR video stream comprises HDR pixel values with light levels encoded at greater than 8 bits per color, per pixel, and the SDR video stream comprises SDR pixel values with light levels encoded at no greater than 8 bits per color, per pixel. The HDR function and the transfer function are performed in real-time on the streaming pixel values such that the SDR video stream can be received and displayed by a receiver as a live broadcast.

The output that gets broadcast is an HDR video signal because the method 101 and the apparatus 201 use multiple sensors at different exposure levels to capture multiple isomorphic images (i.e., identical but for light level) and merge them. Data from a high exposure (HE) sensor are used where portions of an image are dim and data from a mid-exposure (ME) (or lower) sensor are used where portions of an image are more brightly illuminated. The method 101 and apparatus 201 merge the HE and ME (and optionally LE) images to produce an HDR video signal. Specifically, the method 101 and the apparatus 201 identify saturated pixels in the images and replace those saturated pixels with values derived from sensors of a lower exposure. In preferred embodiments, a first pixel value from a first pixel on one of the image sensors is identified as saturated if it is at least 90% of a maximum possible pixel value. The HDR function and the transfer function are done by pipeline processing on a pixel-by-pixel basis while the streaming and transmitting steps are performed simultaneously so that the camera captures the video of a live event for display by the receiver as live playback.

In the HDR stream, HDR pixels have more than 8 bits per color and after application of the transfer function the SDR video stream comprises SDR pixels that use no more than 8 bits per pixel value. The transfer function may be a block on the FPGA 219 that applies an optical-electrical transfer function (OETF) (modifying the gamma function) to a stream of pixels, to convert a video stream with >8 bits per color to a video stream with 8 bits per color. Methods may include applying the inverse EOTF at the other end of the transmission to convert the 8 bits per color video signal into a full >8 bits signal.

For example, a video stream may have 14 bits per color, and be subject to a specific S-log transfer function (in a pipeline process, pixel-by-pixel) to convert each pixel to 8-bits per color. Then this 8-bit video signal is sent via a standard 8-bit television, cable, or satellite channel to a receiver, where the receiver would apply an inverse EOTF to produce a 14-bit signal which is displayed on a special 14-bit display. In some embodiments, the transfer function applies s-log compression, in order to compress HDR video data in the camera (which may capture at 14- or even 16-bits per color per pixel) down to 8 bits per color per pixel. The resultant 8 bit signal is transmit over a typical 8-bit broadcast TV channel (cable, satellite, over-the-air). The inverse process (s-log expansion) restores the video to its original 14- or 16-bits per color per pixel for display on an HDR TV monitor.

Various components of the apparatus 201 may be connected via a printed circuit board 205. The apparatus 201 may also include memory 221 and optionally a processor 227 (such as a general-purpose processor like an Intel chip). Apparatus 201 may further include one or more of an input-output device 239 or a display 267. Memory can include RAM or ROM and preferably includes at least one tangible, non-transitory medium. A processor may be any suitable processor known in the art, such as the processor sold under the trademark XEON E7 by Intel (Santa Clara, Calif.) or the processor sold under the trademark OPTERON 6200 by AMD (Sunnyvale, Calif.). Input/output devices according to the invention may include a video display unit (e.g., a liquid crystal display or LED display), keys, buttons, a signal generation device (e.g., a speaker, chime, or light), a touchscreen, an accelerometer, a microphone, a cellular radio frequency antenna, port for a memory card, and a network interface device, which can be, for example, a network interface card (NIC), Wi-Fi card, or cellular modem. The apparatus 201 may include or be connected to a storage device 241. The plurality of sensors are preferably provided in an arrangement that allows multiple sensors 265 to simultaneously receive images that are identical except for light level.

In some embodiments, the optical splitting system 300 uses two uncoated, 2-micron thick plastic beamsplitters that rely on Fresnel reflections at air/plastic interfaces so their actual transmittance/reflectance (T/R) values are a function of angle. Glass is also a suitable option. In one embodiment, the first beamsplitter 301 is at a 45° angle and has an approximate T/R ratio of 92/8, which means that 92% of the light from the camera lens 311 is transmitted through the first beamsplitter 301 and focused directly onto the high-exposure (HE) sensor 213. The beamsplitter 301 reflects 8% of the light from the lens 311 upwards, toward the second uncoated beamsplitter 319, which has the same optical properties as the first but is positioned at a 90° angle to the light path and has an approximate T/R ratio of 94/6.

Of the 8% of the total light that is reflected upwards, 94% (or 7.52% of the total light) is transmitted through the second beamsplitter 319 and focused onto the medium-exposure (ME) sensor 211. The other 6% of this upward-reflected light (or 0.48% of the total light) is reflected back down by the second beamsplitter 319 toward the first beamsplitter 301 (which is again at 45°), through which 92% (or 0.44% of the total light) is transmitted and focused onto the low-exposure (LE) sensor 261. With this arrangement, the HE, ME and LE sensors capture images with 92%, 7.52%, and 0.44% of the total light gathered by the camera lens 311, respectively. Therefore, the HE and ME exposures are separated by 12.2× (3.61 stops) and the ME and LE are separated by 17.0× (4.09 stops), which means that this configuration is designed to extend the dynamic range of the sensor by 7.7 stops.

This beamsplitter arrangement makes the apparatus 201 light efficient: a negligible 0.04% of the total light gathered by the lens 311 is wasted. It also allows all three sensors to "see" the same scene, so all three images are optically identical except for their light levels. Of course, the ME image has undergone an odd number of reflections and so it is flipped left-right compared to the other images, but this is fixed easily in software. In preferred embodiments, the three sensors are not gen-locked and instead independently stream incoming pixel values directly into a pipeline that includes a synchronization module. This avoids the requirement for a clock or similar triggering apparatus.

Thus it can be seen that the beamsplitter 301 directs a majority of the light to the first path and a lesser amount of the light to the second path. Preferably, the first path and the second path impinge on the HE and the ME sensor 211, respectively, to generate images that are optically identical but for light level. In the depicted embodiment, the apparatus 201 includes a low exposure (LE) sensor.

In preferred embodiments, the HE sensor 213, the ME sensor 211, and the LE sensor 261 are not gen-locked. Pixel values stream from the sensors in sequences directly to the processing device 219. Those sequences may be not synchronized as they arrive onto the processing device 219.

The method 101 may include receiving 107 incoming light through the lens 311 and splitting 113 the light via at least one beamsplitter 301 onto the multiple image sensors, wherein at least 99% of the incoming beam of light 305 is captured by the multiple image sensors.

The apparatus 201 (1) captures optically-aligned, multiple-exposure images simultaneously that do not need image manipulation to account for motion, (2) extends the dynamic range of available image sensors (by over 7 photographic stops in our current prototype), (3) is inexpensive to implement, (4) utilizes a single, standard camera lens 311, (5) efficiently uses the light from the lens 311, and (6) applies an 8-bit EOTF to provide a digital video in real time (by pipeline processing) with no visible contouring and high dynamic range.

The method 101 preferably (1) combines images separated by more than 3 stops in exposure, (2) spatially blends pre-demosaiced pixel data to reduce unwanted artifacts, (3) produces an HDR stream that is radiometrically correct, (4) uses the highest-fidelity (lowest quantized-noise) pixel data available, and (5) applies an 8-bit S-log or similar transfer function. The apparatus 201 can work with a variety of different sensor types and uses an optical architecture based on beamsplitters located between the camera lens and the sensors.

Figure 6:
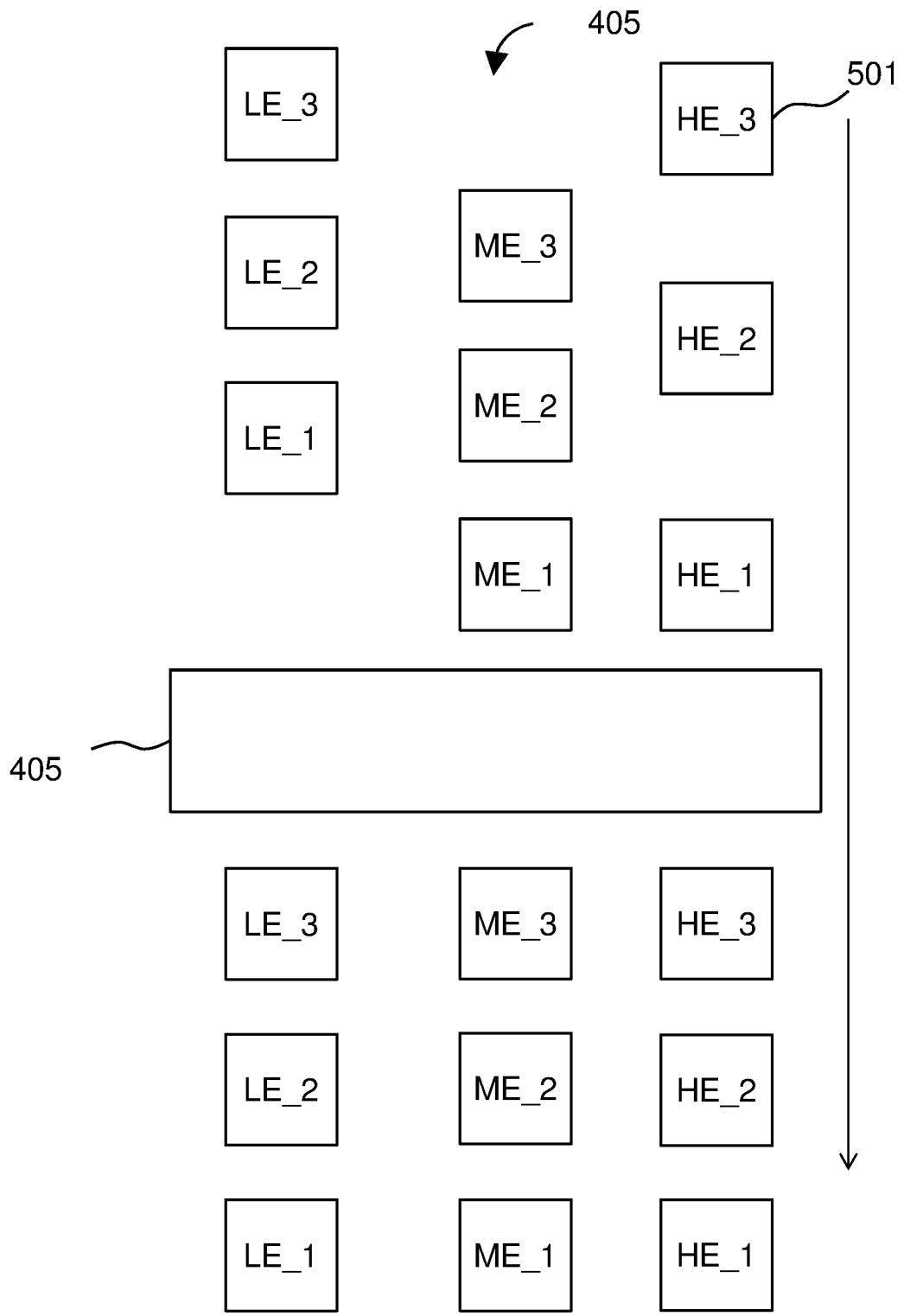
FIG. 6 shows operation of the sync module.

FIG. 6 shows operation of the sync module 405 to synchronize the pixel values 501 as the pixel values 501 stream onto the processing device 219 from the plurality of image sensors 265. The HE_1 pixel value and ME_1 pixel value are arriving at the sync module 405 approximately simultaneously. However, HE_2 pixel value will arrive late compared to ME_2, and the entire sequence of LE pixel values will arrive late. The sync module 405 can contain small line buffers that circulate the early-arriving pixel values and release them simultaneous with the corresponding later-arriving pixel values. The synchronized pixel values then stream through the pipeline 231 to the kernel operation 413.

Figure 7:
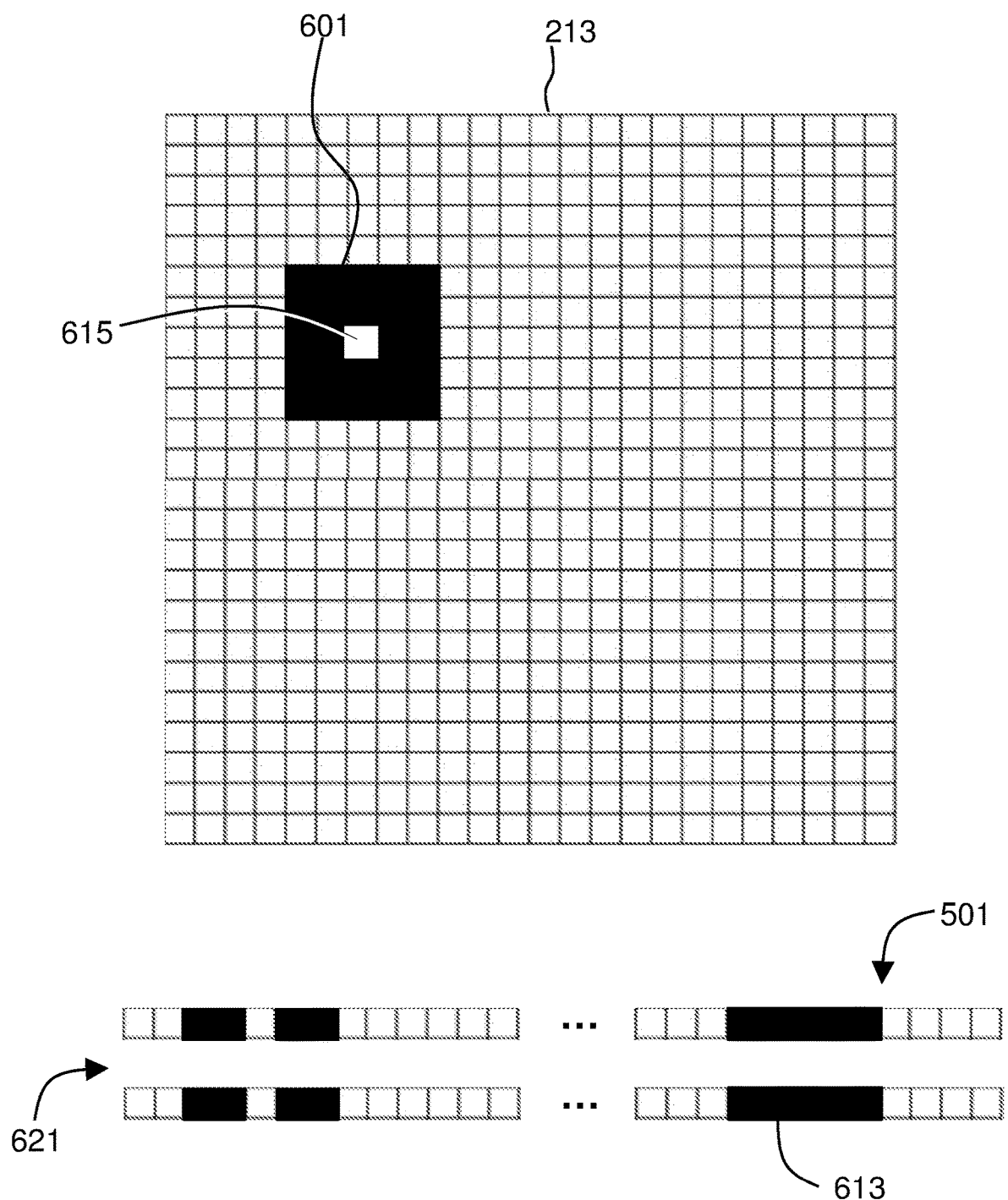
FIG. 7 illustrates how the pixel values are presented to the kernel operation.

FIG. 7 illustrates how the pixel values are presented to the kernel operation 413. The top part of the figures shows the HE sensor 213. Each square depicts one pixel of the sensor 213. A heavy black box with a white center is drawn to illustrate a given pixel 615 for consideration and a neighborhood 601 of pixels surrounding the given pixel 615. The heavy black box would not actually appear on a sensor 213 (such as a CMOS cinematic camera sensor)—it is merely drawn to illustrate what the neighborhood 601 includes and to aid understanding how the neighborhood 601 appears when the sequences 621 of pixel values 501 are presented to the kernel operation 413. The sequences 621 of pixel values stream into the kernel operation 413 after the sync module 405. Pixel values 501 from the neighborhood 601 of pixels on the sensor 213 are still "blacked out" to aid illustration. The given pixel 615 under consideration can be spotted easily because it is surrounded on each side by two black pixels from the row of pixels on the sensor. There are two sequences 621, one of which comes from the depicted HE sensor 213 and one of which originates at the ME sensor 211.

Streaming the pixel values 501 through the kernel operation 413 includes examining values from a neighborhood 601 of pixels surrounding a first pixel 615 on the HE sensor 213, finding saturated values in the neighborhood 601 of pixels, and using information from a corresponding neighborhood 613 from the ME sensor 211 to estimate a value for the first pixel 615. This will be described in greater detail below. To accomplish this, the processing device must make comparisons between corresponding pixel values from different sensors. It may be useful to stream the pixel values through the kernel operation in a fashion that places the pixel under consideration 615 adjacent to each pixel from the neighborhood 601 as well as adjacent to each pixel from the corresponding neighborhood on another sensor. For background, see Bravo, 2011, Efficient smart CMOS camera based on FPGAs oriented to embedded image processing, Sensors 11:2282-2303; Lyu, 2014, A 12-bit high-speed column parallel two-step single-slope analog-to-digital converter (ADC) for CMOS image sensors, Sensors 14:21603-21625; Ab Rahman, 2011, Pipeline synthesis and optimization of FPGA-based video processing applications with CAL, EURASIP J Image Vid Processing 19:1-28; Schulte, 2016, HDR Demystified: Emerging UHDTV systems, SpectraCal 1-22; U.S. Pub. 2017/0237890; U.S. Pub. 2017/0238029; and U.S. Pat. No. 8,982,962 to Gish, the contents of each of which are incorporated by reference.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A video processing method comprising:
  receiving incoming light through a lens of a camera;
  splitting by a beamsplitter the incoming light onto multiple image sensors that convert the incoming light to pixel values;
  streaming the pixel values from the at least one image sensor through a pipeline on a processor wherein the pipeline includes
    an HDR function that combines the streaming pixel values in real-time into an HDR stream, and
    a reversible logarithmic transfer function that reversibly converts the HDR stream to an SDR video stream, wherein at least some of the pixel values of an image frame are converted by the transfer function while the at least one image sensor is still converting the incoming light into the pixel values for the image frame; and
  transmitting the SDR video stream from the camera to a receiver in real time for display as a video, wherein the HDR function and the transfer function are done by pipeline processing on a pixel-by-pixel basis while the streaming and transmitting steps are performed simultaneously to thereby capture the video of a live event for live playback by the receiver.

2. The method of claim 1, wherein the HDR stream comprises HDR pixels that use greater than 8 bits per color and the SDR video stream comprises SDR pixels that use no more than 8 bits per pixel value.

3. The method of claim 1, wherein the transfer function comprises an opto-electrical transfer function, and the method further comprises providing the receiver with an electro-optical transfer function for use by the receiver to convert the SDR video stream into an HDR video stream with the range of brightness greater than covered by the ITU Recommendation 709 curve.

4. The method of claim 3, wherein the receiver comprises a high-dynamic range display device.

5. The method of claim 1, wherein the transfer function comprises an S-Log gamma curve.

6. The method of claim 1, wherein the transfer function compresses the HDR stream down to 8 bits per color per pixel in the SDR video stream.

7. The method of claim 6, further wherein the multiple image sensors each receive images that are identical but for light level.

8. The method of claim 7, wherein the pipeline includes a kernel operation that identifies saturated pixel values and a merge operation that merges the pixel values to produce the HDR stream, wherein the transfer function applies an opto-electrical transfer function (OETF) to pixel values in the HDR stream.

9. The method of claim 8, wherein the multiple image sensors include at least a high exposure (HE) sensor and a middle exposure (ME) sensor, and wherein merging the sequences includes using HE pixel values that are not saturated and ME pixel values corresponding to the saturated pixel values.

10. The method of claim 8, wherein streaming the pixel values through the kernel operation includes examining values from a neighborhood of pixels surrounding a first pixel on the HE sensor, finding saturated values in the neighborhood of pixels, and using information from a corresponding neighborhood on the ME sensor to estimate a value for the first pixel.

11. The method of claim 8, wherein at least some pixel values are converted to SDR by the OETF while the image sensors are still converting the incoming light into the pixel values for the same image.

12. The method of claim 8, wherein sequences of the pixel values are streamed through the processing device and merged without waiting to receive pixel values for an entire image from all pixelsites on the image sensors.

13. A high dynamic range video camera comprising:
at least one image sensor coupled to a processor; and
a pipeline on the processor that processes streams of pixel values from the sensor, wherein the pipeline comprises:
an HDR function that combines the streaming pixel values in real-time into an HDR video stream, and
a reversible logarithmic transfer function that converts the HDR video stream to an SDR video stream, wherein at least some of the pixel values of an image frame are converted by the transfer function while the at least one image sensor is still converting the incoming light into the pixel values for the image frame,
wherein the HDR function and the transfer function are performed in real-time by pipeline processing on a pixel-by-pixel basis on the streaming pixel values such that the SDR video stream can be received and displayed by a receiver as a live broadcast.

14. The camera of claim 13, wherein the HDR video stream comprises HDR pixel values with light levels encoded at greater than 8 bits per color, per pixel, and the SDR video stream comprises SDR pixel values with light levels encoded at no greater than 8 bits per color, per pixel.

15. The camera of claim 13, wherein SDR video stream can be received and displayed by a receiver as a live broadcast.

16. The camera of claim 13, wherein the image sensor is provided in an optical splitting system that comprises a lens, at least one beamsplitter, and a plurality of image sensors.

17. The camera of claim 16, wherein the plurality of image sensors include at least a high exposure (HE) sensor and a middle exposure (ME) sensor, wherein the HE sensor, the ME sensor, the lens and the at least one beamsplitter are arranged to receive an incoming beam of light and split the beam of light into at least a first path that impinges and HE sensor and a second path that impinges on the ME sensor.

18. The camera of claim 17, wherein the beamsplitter directs a majority of the light to the first path and a lesser amount of the light to the second path.

19. The camera of claim 18, wherein the HDR function in the pipeline includes a kernel operation that identifies saturated pixel values and a merge module to merge the pixel values to form the HDR video stream.

20. The camera of claim 19, wherein the first path and the second path impinge on the HE and the ME sensor, respectively, to generate images that are optically identical but for light level.

21. The camera of claim 20, wherein the kernel operation operates on pixel values as they stream from each of the plurality of image sensors by examining, for a given pixel on the HE sensor, values from a neighborhood of pixels surrounding the given pixel, finding saturated values in the neighborhood of pixels, and using information from a corresponding neighborhood on the ME sensor to estimate a value for the given pixel.

22. The camera of claim 21, wherein the pipeline includesin the order in which the pixel values flow:
a sync module to synchronize the pixel values as the pixel values stream onto the processing device from the plurality of image sensors;
the HDR function comprising the kernel operation and the merge module;
a demosaicing module;
a tone-mapping operator; and
the transfer function.

23. The camera of claim 22, wherein the transfer function comprises an opto-electrical transfer function (OETF).

24. The camera of claim 23, wherein the OETF comprises an S-Log function.

* * * * *